United States Patent
Li et al.

(10) Patent No.: US 8,913,568 B2
(45) Date of Patent: Dec. 16, 2014

(54) COMMUNICATION METHOD AND SYSTEM USING UPLINK MULTIPLE INPUT MULTIPLE OUTPUT TECHNOLOGY

(75) Inventors: Jing Li, Shanghai (CN); Xueli Ma, Shanghai (CN); Zongjie Wang, Shanghai (CN); Yuanyu Zhang, Shenzhen (CN); Kun Yan, Beijing (CN); Chuanfeng He, Beijing (CN); Bo Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 335 days.

(21) Appl. No.: 13/228,590

(22) Filed: Sep. 9, 2011

(65) Prior Publication Data

US 2012/0002624 A1 Jan. 5, 2012

Related U.S. Application Data

(63) Continuation of application No. PCT/CN2009/070713, filed on Mar. 10, 2009.

(51) Int. Cl.
*H04W 4/00* (2009.01)
*H04B 7/04* (2006.01)
*H04B 7/06* (2006.01)

(52) U.S. Cl.
CPC ............ *H04B 7/0404* (2013.01); *H04B 7/0413* (2013.01); *H04B 7/0689* (2013.01)
USPC ......................................................... 370/329

(58) Field of Classification Search
None
See application file for complete search history.

(56) References Cited

U.S. PATENT DOCUMENTS

| | | | |
|---|---|---|---|
| 2006/0193275 A1* | 8/2006 | Umesh et al. | 370/310 |
| 2006/0205357 A1 | 9/2006 | Kim | |
| 2006/0246847 A1* | 11/2006 | Kim et al. | 455/69 |
| 2006/0268773 A1* | 11/2006 | Ranta-aho et al. | 370/329 |
| 2006/0291403 A1* | 12/2006 | Kahtava et al. | 370/252 |
| 2007/0165576 A1 | 7/2007 | Wang et al. | |
| 2008/0107197 A1 | 5/2008 | Jen et al. | |
| 2009/0086698 A1* | 4/2009 | Roy et al. | 370/338 |
| 2010/0157953 A1* | 6/2010 | Christoffersson et al. | 370/336 |
| 2010/0220647 A1* | 9/2010 | Baker et al. | 370/328 |

FOREIGN PATENT DOCUMENTS

| | | |
|---|---|---|
| CN | 101102141 A | 1/2008 |
| CN | 101132615 | 2/2008 |
| CN | 101160770 A | 4/2008 |
| CN | 101359949 | 2/2009 |

(Continued)

OTHER PUBLICATIONS

International Search Report for PCT/CN2009/070713, mailed Dec. 3, 2009.

(Continued)

*Primary Examiner* — Minh-Trang Nguyen
(74) *Attorney, Agent, or Firm* — Staas & Halsey LLP (57) ABSTRACT

The present invention discloses a communication method and system using MIMO technology. The communication method includes: a network side device determines whether a UE uses a single-stream mode or a multi-stream mode as an uplink data transmission mode; and the network side device notifies the UE of indication information indicating the determined uplink data transmission mode. The communication method and system help the UE to use a specific uplink data transmission mode in combination with various factors, therefore reducing a delay of an uplink data transmission, improving an uplink data transmission speed, thereby meeting development needs of uplink high-speed data communication services of the UE.

13 Claims, 4 Drawing Sheets

(56) References Cited

FOREIGN PATENT DOCUMENTS

| CN | 101359949 A | 2/2009 |
|----|----|----|
| CN | 101359953 A | 2/2009 |
| EP | 2 180 604 A1 | 4/2010 |
| WO | 2006/116102 A2 | 11/2006 |
| WO | 2006/138337 A1 | 12/2006 |

OTHER PUBLICATIONS

Office Action, dated Mar. 29, 2013, in corresponding Chinese Application No. 200980121733.8 (16 pp.).

International Preliminary Report on Patentability issued Sep. 13, 2011 in corresponding International Patent Application PCT/CN2009/070713.

European Search Report dated Dec. 14, 2011 issued in corresponding European Patent Application No. 09841312.3.

3GPP TSG-RAN WG1, "A discussion on single stream with multi RV versions mode in DC-HSDPA operation", Meeting #54, Aug. 18-22, 2008, pp. 1-2.

3GPP TSG-RAN1, "Uplink SU-MIMO Design Operations for LTE Advanced", Meeting #56, Feb. 9-13, 2009, pp. 1-4.

3GPP TSG-RAN WG1, "HS-SCCH orders in MIMO mode", Meeting #49, May 7-11, 2007, pp. 1-13.

3GPP TSG-RAN WG1, "Uplink US-MIMO for E-UTRA", Meeting #53, Jun. 30-Jul. 4, 2008, pp. 1-6.

European Office Action dated Jan. 16, 2014 in corresponding European Patent Application No. 09841312.3-1854; (10 pages).

Ericsson et al., "Support of CPC feature," "*Change Request*"; R1-071173; 3GPP TSG-RAN WG1 Meeting #48, St. Louis, USA, Feb. 12-16, 2007; (12 pages).

\* cited by examiner

COMMUNICATION METHOD AND SYSTEM USING UPLINK MULTIPLE INPUT MULTIPLE OUTPUT TECHNOLOGY

CROSS-REFERENCE TO RELATED APPLICATIONS

This application is a continuation of International Application No. PCT/CN2009/070713, filed on Mar. 10, 2009, which is hereby incorporated by reference in its entirety.

FIELD OF THE INVENTION

The present invention relates to the field of communication technologies, and in particular to a communication method and system using uplink Multiple Input Multiple Output (MIMO) technology in the field of wireless communication technologies.

BACKGROUND OF THE INVENTION

With the rapid development of communication technologies, Wideband Code Division Multiple Access (WCDMA), as one of the mainstream technologies of third generation mobile communication systems, is widely studied and applied all over the world. At present, WCDMA have versions such as Release99 (R99), Release4 (R4), Release5 (R5), Release6 (R6), Release7 (R7) and Release8 (R8). In order to improve a data transmission speed and meet different requirements, a downlink MIMO technology is introduced to the R7 version of WCDMA, thereby improving a downlink data transmission speed and throughput by a great degree.

In comparison, uplink data transmission speed and throughput are relatively low, which fails to support data communication services requiring a high speed such as mobile multimedia, a video conference in a mobile process, and an interactive multimedia game. Therefore, in the future R9 version or later versions, the uplink data speed and throughput of a User Equipment (UE) urgently need to be improved, so as to reduce a delay of data transmission and meet development needs of uplink data transmission services at a higher speed.

One solution is continuous evolution of the MIMO technology, that is, the MIMO technology is also used in the uplink as well, thereby further improving the uplink data speed of the UE and reducing the delay of data transmission. However, when the UE uses the uplink MIMO technology for uplink data transmission, the UE needs to know whether to use a single-stream mode or a multi-stream mode during the uplink data transmission. The single-stream mode refers to that during a certain time range (such as 2 ms or 10 ms), the UE only uploads one transport block during uplink data transmission. Similarly, the multi-stream mode refers to that during a certain time range (such as 2 ms or 10 ms), the UE uploads two or more transport blocks during uplink data transmission.

SUMMARY OF THE INVENTION

A main objective of embodiments of the present invention is to determine, in uplink MIMO technology, whether a UE uses a single-stream mode or a multi-stream mode during uplink data transmission, so that the UE uses different uplink data transmission modes according to different situations, therefore meeting requirements of uplink high-speed data communication services.

To solve the above technical problem, an embodiment of the present invention provides a communication method using the uplink MIMO technology, where the method includes:

a determination step, where a network side device determines whether a UE uses a single-stream mode or a multi-stream mode as an uplink data transmission mode; and a notification step, where the network side device notifies the UE of indication information indicating the determined uplink data transmission mode.

An embodiment of the present invention also provides a communication system using the uplink MIMO technology, where the communication system includes a network side device and a UE, where the network side device includes:

a determination module, configured to determine whether the UE uses a single-stream mode or a multi-stream mode as an uplink data transmission mode; and a notification module, configured to notify the UE of the indication information indicating the determined uplink data transmission mode of the UE.

Based on the above technical solutions, the embodiments of the present invention provide the communication method and system using the uplink MIMO technology, so that the network side device can determine whether the UE uses the single-stream mode or the multi-stream mode during uplink data transmission, and can conveniently notify the UE of the uplink data transmission mode determined by the network side device. Moreover, by using different modes, in the embodiments of the present invention, the indication information determined by the network side device is conveniently and timely notified to the UE. The operation is easy, and the transmission is convenient and easy to be implemented.

BRIEF DESCRIPTION OF THE DRAWINGS

The following describes the embodiments of the present invention in detail with reference to the accompanying drawings, where.

DETAILED DESCRIPTION OF THE EMBODIMENTS

In order to make it easy for persons of ordinary skill in the art to understand and implement the present invention, the present invention is illustrated in detail with reference to the accompanying drawings and the specific embodiments.

Figure 1:
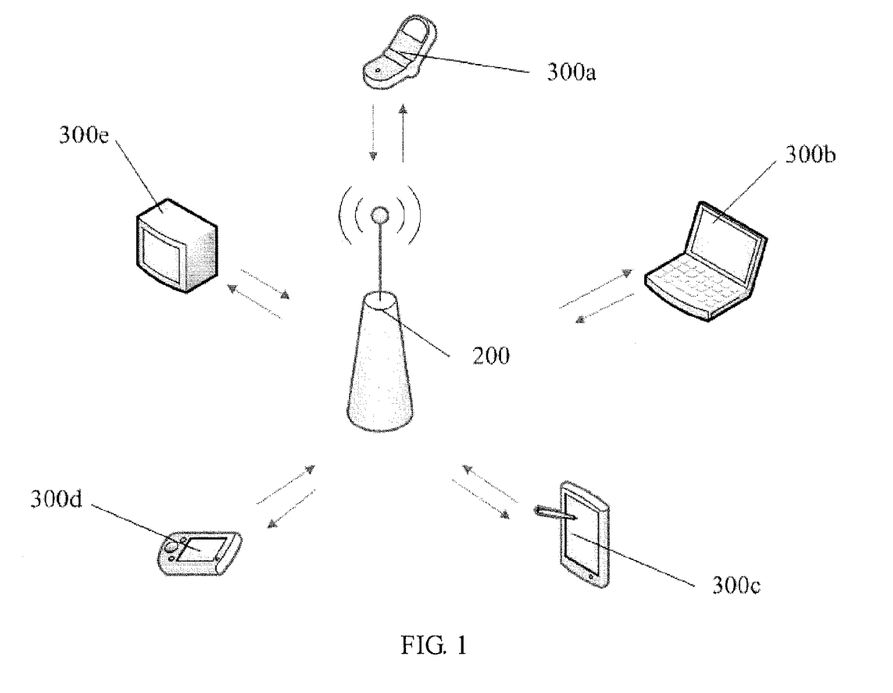
FIG. 1 is a schematic diagram of a communication system capable of applying an embodiment of the present invention.

FIG. 1 is a schematic diagram of a communication system 100 capable of applying an embodiment of the present invention. The communication system 100 includes a network side device 200 and a UE. The network side device 200 includes, but is not limited to, a Node B, a Radio Network Controller (RNC) and a Radio Network Subsystem (RNS). The UE includes, but is not limited to, a mobile phone 300a, a portable computer 300b, a Personal Digital Assistant (PDA) 300c, a portable game console 300d and a portable multimedia player 300e.

Figure 2:
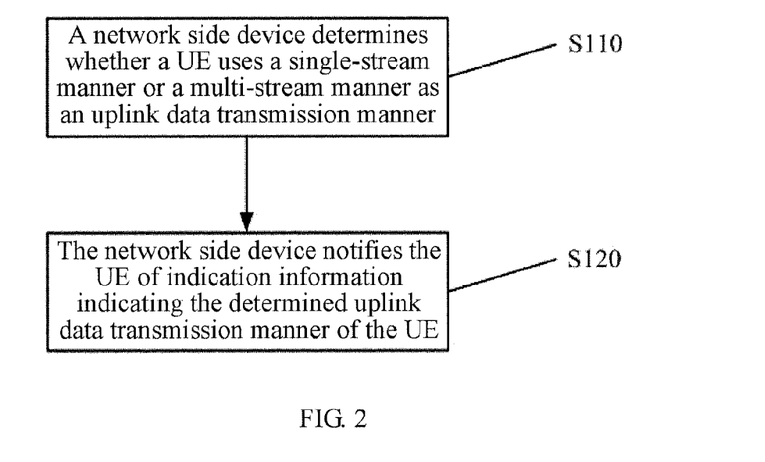
FIG. 2 is a flow chart of a communication method according to an embodiment of the present invention.

A communication method according to an embodiment of the present invention is described below. As shown in FIG. 2, the communication method using uplink MIMO technology according to the embodiment of the present invention includes the following steps.

Determination step S110: A network side device determines whether a UE uses a single-stream mode or a multi-stream mode as an uplink data transmission mode.

Notification step S120: The network side device notifies the UE of indication information indicating the determined uplink data transmission mode of the UE.

In the present invention, the network side device determines whether the UE uses the single-stream mode or the multi-stream mode during the uplink data transmission, and notifies the UE of the uplink data transmission mode, which avoids problems such as a long delay, errors and even termination in data processing caused by factors such as a limited resource and scheduling capability of the network side device when the UE directly uses the multi-stream mode during the uplink data transmission. Moreover, the network side device combines factors such as an uplink transmission data amount of the UE, quality of a channel related to the uplink data transmission and a power of the UE, so that the UE is capable of fully utilizing the resource of the network side device, and meanwhile capable of using a specific uplink data transmission mode according to an uplink data transmission situation of each UE combining a load situation of an entire cell, as well as different requirements for uplink data transmission of different UEs. In this mode, the delay of the uplink data transmission is reduced, and an uplink data transmission speed is increased, thereby satisfying development needs of uplink high-speed data communication services of the UE.

The network side device can determine whether the UE uses the single-stream mode or the double-stream mode during the uplink data transmission according to any one of, several of or all of the following factors: the uplink transmission data amount of the UE, the quality of the channel related to the uplink data transmission, the scheduling capability of an Node B, the load situation of the serving cell where the UE is located and the power of the UE. For example, when the uplink transmission data amount of the UE is great, the quality of the channel related to the uplink data transmission is good, or the scheduling capability of the Node B is great, the network side device may determine that the UE uses the multi-stream mode during the uplink data transmission. On the contrary, when the uplink transmission data amount of the UE is small, the quality of the channel related to the uplink data transmission is poor, or the scheduling capability of the Node B is limited, the network side device may determine that the UE uses the single-stream mode during uplink data transmission. Definitely, the network side device may determine the uplink data transmission mode of the UE after considering partial or all of the above factors in a comprehensive mode.

For example, when a size of an uplink data transport block of the UE is greater than or equal to 1458 bits, an RNC may regard that the uplink data amount of the UE is great, thereby determining that the UE uses the multi-stream mode during the uplink data transmission. When the size of the uplink data transport block of the UE is smaller than 1458 bits, the RNC may regard that the uplink data amount of the UE is small, thereby determining that the UE uses the single-stream mode during the uplink data transmission. Alternatively, when a block error rate of the channel is smaller than 5%, an RNS may regard that the quality of the channel is good, thereby determining that the UE uses the multi-stream mode during the uplink data transmission. When the block error rate of the channel is greater than 5%, the RNS may regard that the quality of the channel is poor, thereby determining that the UE uses the single-stream mode during the uplink data transmission. Alternatively, when the scheduling capability of the Node B does not exceed 75% of a load capability of the Node B, the Node B may regard the scheduling capability of the Node B is strong, thereby determining that the UE uses the multi-stream mode during the uplink data transmission. Similarly, when the scheduling capability of the Node B exceeds 75% of the load capability of the Node B, the Node B may regard that the scheduling capability of the Node B is limited, thereby determining that the UE uses the single-stream mode during the uplink data transmission.

When the network side device is the Node B, that is, the Node B determines whether the UE uses the single-stream mode or the multi-stream mode during the uplink data transmission and notifies the UE of the uplink data transmission mode. In the notification step S120, the Node B may notify the UE of the indication information indicating the determined uplink data transmission mode of the UE in multiple modes.

In an embodiment, the Node B may notify the UE of the indication information by delivering a Shared Control Channel for High Speed Downlink Shared Channel (HS-DSCH) order (HS-SCCH order).

An HS-SCCH transmits the following related contents:

1. Channelization-code-set information $x_{ccs,1}, x_{ccs,2}, \ldots, x_{ccs,7}$, 7 bits;
2. Modulation scheme and number of transport blocks information $x_{ms,1}, x_{ms,2}, x_{ms,3}$, 3 bits;
3. Precoding weight information $x_{pwipb,1}, x_{pwipb,2}$, 2 bits;
4. Transport block size information $x_{tbspb,1}, x_{tbspb,2}, \ldots, x_{tbspb,6}$, 6 bits;
5. Hybrid Automatic Repeat Request (HARQ) process information $x_{hap,1}, x_{hap,2}, \ldots, x_{hap,4}$, 4 bits;
6. Redundancy and constellation version information $x_{rvpb,1}, x_{rvpb,2}$, 2 bits;
7. UE identity (ID) $x_{ue,1}, x_{ue,2}, \ldots, x_{ue,16}$, 16 bits.

When the Node B delivers the HS-SCCH order, the HARQ process information $x_{hap,1}, x_{hap,2}, x_{hap,3}, x_{hap,4}$ and the redundancy and constellation version information $x_{rvpb,1}, x_{rvpb,2}$ are set to $x_{odt,1}, x_{odt,2}, x_{odt,3}, x_{ord,1}, x_{ord,2}, x_{ord,3}$, where $x_{odt,1}, x_{odt,2}, x_{odt,3}$ is order type, and $x_{ord,1}, x_{ord,2}, x_{ord,3}$ is order. In addition, the channelization-code-set information $x_{ccs,1}, x_{ccs,2}, \ldots, x_{ccs,7}$ is fixedly set to 1110000. The modulation scheme and the number of the transport blocks information $x_{ms,1}, x_{ms,2}, x_{ms,3}$ is fixedly set to 000. The precoding weight information $x_{pwipb,1}, x_{pwipb,2}$ is fixedly set to 00. The transport block size information $x_{tbspb,1}, x_{tbspb,2}, \ldots, x_{tbspb,6}$ is fixedly set to 111101. The above HS-SCCH order is notified to the UE through radio channel transmission after a series of coding processes.

It can be known from the above description that, except the order type $x_{odt,1}, x_{odt,2}, x_{odt,3}$ and the order $x_{ord,1}, x_{ord,2}, x_{ord,3}$, the rest of the information is fixed. Therefore, the indication information may be borne by setting the order type and the order, so as to indicate whether the uplink data transmission mode of the UE determined by the Node B is the single-stream mode or the multi-stream mode.

When the order type $x_{odt,1}, x_{odt,2}, x_{odt,3}$="001", the order $x_{ord,1}$ or $x_{ord,2}$ may be set to bear the indication information, or the order $x_{ord,1}$ and $x_{ord,2}$ may be set at the same time to bear the indication information. When the order type $x_{odt,1}, x_{odt,2}, x_{odt,3}$ is set to any binary combination except "000" and "001", the order $x_{odt,1}$ or $x_{odt,2}$ or $x_{odt,3}$ or any combination of the order $x_{odt,1}$, $x_{odt,2}$, $x_{odt,3}$ may be set to bear the indication information.

For example, $x_{odt,1}$, $x_{odt,2}$, $x_{odt,3}$="001" and $x_{ord,1}$="0" may be set to indicate that the uplink data transmission mode of the UE determined by the Node B is the single-stream mode, and $x_{odt,1}$, $x_{odt,2}$, $x_{odt,3}$="001" and $x_{ord,1}$="1" may be set to indicate that the uplink data transmission mode of the UE determined by the Node B is the multi-stream mode.

Definitely, $x_{odt,1}$, $x_{odt,2}$, $x_{odt,3}$="001" and $x_{ord,1}$="1" may be set to indicate that the uplink data transmission mode of the UE determined by the Node B is the single-stream mode, and $x_{odt,1}$, $x_{odt,2}$, $x_{odt,3}$="001" and $x_{ord,1}$="0" may be set to indicate that the uplink data transmission mode of the UE determined by the Node B is the multi-stream mode.

Alternatively, $x_{odt,1}$, $x_{odt,2}$, $x_{odt,3}$="001" and $x_{ord,2}$="1" are set to indicate that the uplink data transmission mode of the UE determined by the Node B is the single-stream mode, and $x_{odt,1}$, $x_{odt,2}$, $x_{odt,3}$="001" and $x_{ord,2}$="0" are set to indicate that the uplink data transmission mode of the UE determined by the Node B is the multi-stream mode.

Alternatively, $x_{odt,1}$, $x_{odt,2}$, $x_{odt,3}$="001" and $x_{odt,1}$, $x_{odt,2}$="00" or "01" or "10" are set to indicate the single-stream mode, and $x_{odt,1}$, $x_{odt,2}$, $x_{odt,3}$="010" and $x_{odt,1}$, $x_{odt,2}$="11" are set to indicate the multi-stream mode.

Similarly, $x_{odt,1}$, $x_{odt,2}$, $x_{odt,3}$="010" and $x_{odt,1}$, $x_{odt,3}$="10" or "01" may be set to indicate the single-stream mode, and $x_{odt,1}$, $x_{odt,2}$, $x_{odt,3}$="010" and $x_{odt,1}$, $x_{odt,3}$="00" or "11" may be set to indicate the multi-stream mode.

Alternatively, $x_{odt,1}$, $x_{odt,2}$, $x_{odt,3}$="010" and $x_{odt,1}$, $x_{odt,2}$="00" are set to indicate the single-stream mode, and $x_{odt,1}$, $x_{odt,2}$, $x_{odt,3}$="010" and $x_{odt,1}$, $x_{odt,2}$="10", "01" or "11" are set to indicate the multi-stream mode.

Optimally, the order type and the order may be set to bear the indication information of a specific uplink transmission data stream. For example, in a specific situation of two uplink antennas, $x_{odt,1}$, $x_{odt,2}$, $x_{odt,3}$="011" and $x_{odt,2}$, $x_{odt,3}$="01" may be set to indicate that the uplink transmission is performed on a particular data stream of the uplink data transmission of the UE (namely the single-stream mode); $x_{odt,1}$, $x_{odt,2}$, $x_{odt,3}$="011" and $x_{odt,2}$, $x_{odt,3}$="10" are set to indicate that the uplink transmission is performed on another particular data stream of the uplink data transmission of the UE (namely the single-stream mode); $x_{odt,1}$, $x_{odt,2}$, $x_{odt,3}$="011" and $x_{odt,2}$, $x_{odt,3}$="11" are set to indicate that the uplink transmission is performed on both of the particular data streams of the uplink data transmission of the UE (namely the double-stream mode). Definitely, when the UE has more uplink transmission data streams, more order bits may be used to indicate the specific one or several uplink transmission data streams on which the uplink transmission is performed.

In this embodiment, the Node B uses the HS-SCCH order to bear the indication information of the uplink data transmission mode of the UE, which fully utilizes existing resources and improves a utilization ratio of the resources. Moreover, the operation is simple and easy to be implemented. Also, the solution of this embodiment has a good compatibility with the prior art.

In another exemplary embodiment, the Node B may notify the UE of the indication information through an absolute grant delivered on an E-AGCH.

Figure 3:
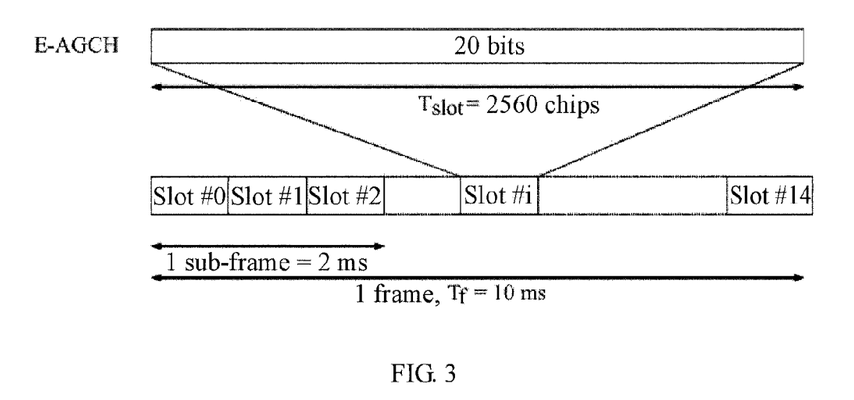
FIG. 3 is a schematic diagram of a frame structure of an Enhanced Dedicated Channel (E-DCH) Absolute Grant Channel (E-AGCH)

In the R6 version, High Speed Uplink Packet Access (HSUPA) technology is introduced. An E-DCH transmission channel is newly added, and physical channels such as an E-AGCH and an E-RGCH are added correspondingly. The E-AGCH is sent from an E-DCH serving cell and bears the information of an absolute grant value and an absolute grant scope sent by the E-DCH serving cell to the UE. The E-AGCH is a downlink physical channel with a fixed rate (30 kbps, SF=256). The E-AGCH is also a public channel and carries an absolute grant of an uplink E-DCH. A frame structure and sub-frame structure of the E-AGCH are shown in FIG. 3.

If the Transmission Time Interval (TTI) of the E-DCH is 2 ms, the TTI of the E-AGCH is also 2 ms. If the TTI of the E-DCH is 10 ms, absolute grant indications sent by the E-AGCH are repeated based on every 5 sub-frames.

The absolute grant delivered on the E-AGCH includes contents in the following two aspects.

1. The absolute grant value: $x_{agv,1}$, $x_{agv,2}$, ..., $x_{agv,5}$, and a range of the absolute grant value is 0 to 31, which represents a power ratio value between a maximum E-DCH Dedicated Physical Data Channel (E-DPDCH) that the UE is allowed to use and an E-DCH Dedicated Physical Control Channel (E-DPCCH). A mapping relationship between an index value and the specific absolute grant value is shown in Table 1 or Table 2 (the specific table used by the UE is determined by an upper layer and a notification is delivered to the UE), where ZERO_GRANT represents zero grant, and INACTIVE represents inactivation.

TABLE 1

| Absolute Grant Value | Index Value |
| --- | --- |
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZERO_GRANT* | 1 |
| INACTIVE* | 0 |

TABLE 2

| Absolute Grant Value | Index Value |
| --- | --- |
| $(377/15)^2 \times 4$ | 31 |
| $(237/15)^2 \times 6$ | 30 |
| $(168/15)^2 \times 6$ | 29 |
| $(150/15)^2 \times 6$ | 28 |
| $(168/15)^2 \times 4$ | 27 |
| $(150/15)^2 \times 4$ | 26 |
| $(134/15)^2 \times 4$ | 25 |
| $(119/15)^2 \times 4$ | 24 |
| $(150/15)^2 \times 2$ | 23 |

TABLE 2-continued

| Absolute Grant Value | Index Value |
|---|---|
| $(95/15)^2 \times 4$ | 22 |
| $(168/15)^2$ | 21 |
| $(150/15)^2$ | 20 |
| $(134/15)^2$ | 19 |
| $(119/15)^2$ | 18 |
| $(106/15)^2$ | 17 |
| $(95/15)^2$ | 16 |
| $(84/15)^2$ | 15 |
| $(75/15)^2$ | 14 |
| $(67/15)^2$ | 13 |
| $(60/15)^2$ | 12 |
| $(53/15)^2$ | 11 |
| $(47/15)^2$ | 10 |
| $(42/15)^2$ | 9 |
| $(38/15)^2$ | 8 |
| $(34/15)^2$ | 7 |
| $(30/15)^2$ | 6 |
| $(27/15)^2$ | 5 |
| $(24/15)^2$ | 4 |
| $(19/15)^2$ | 3 |
| $(15/15)^2$ | 2 |
| ZERO_GRANT* | 1 |
| INACTIVE* | 0 |

2. The absolute grant scope: $x_{ags,1}$ is used to indicate activating or inactivating a particular or all HARQ processes. Mapping of the absolute grant scope is shown in Table 3.

TABLE 3

| Absolute grant scope | $x_{ags,1}$ |
|---|---|
| An Absolute HARQ Process | 1 |
| AH HARQ Processes | 0 |

After a series of coding processes, the absolute grant value and the absolute grant scope arrive at the UE through transmission of the radio channel.

It can be known from the above description that, the absolute grant sent by the E-AGCH includes the absolute grant value and the absolute grant scope. These two aspects of the contents bear information related to the uplink data transmission mode of the UE. Each uplink data stream has a corresponding E-AGCH. Therefore, the absolute grant value and the absolute grant scope delivered through the E-AGCH of each uplink transmission data stream of the UE may be set to bear the uplink data transmission mode of the UE determined by the Node B.

In this embodiment, when the Node B determines that the UE uses the single-stream mode as the uplink data transmission mode, the Node B sets the E-AGCH corresponding to one data stream in the multiple uplink transmission data streams, so as to deliver an absolute grant with an absolute grant value corresponding to an index value except 0 and 1; the Node B sets the E-AGCHs corresponding to the rest of the data streams in the multiple uplink transmission data streams, so as to respectively deliver an absolute grant with an absolute grant value corresponding to the index value 0 or 1 and with an absolute grant scope corresponding to the index value 0. In this way, for the E-AGCH that delivers the absolute grant with the absolute grant value corresponding to the index value except 0 and 1, the uplink transmission data stream corresponding to the E-AGCH is capable of uplink data transmission, and the rest of the uplink transmission streams are incapable of the uplink data transmission. Therefore, it is implemented that the Node B notifies the UE of the indication information indicating the single-stream mode, and the indication information can indicate the specific uplink transmission data stream on which the uplink transmission is performed.

When the Node B determines that the UE uses the multi-stream mode as the uplink data transmission mode, the Node B may set the E-AGCHs corresponding to at least two uplink transmission data streams of the multiple uplink transmission data streams, so as to respectively deliver the absolute grant with the absolute grant value corresponding to the index value except 0 and 1. Therefore, it is implemented that the Node B notifies the UE of the indication information indicating the multi-stream mode.

When the Node B determines that the UE uses the multi-stream mode as the uplink data transmission mode, the Node B may set the E-AGCHs corresponding to all data streams meeting uplink transmission conditions of the multiple uplink transmission data streams, so as to respectively deliver the absolute grant with the absolute grant value corresponding to the index value except 0 and 1. In addition, the Node B sets the E-AGCHs corresponding to the rest of the data streams of the multiple uplink transmission data streams, so as to respectively deliver the absolute grant with the absolute grant value corresponding to the index value 0 or 1 and with the absolute grant scope corresponding to the index value 0. Therefore, all the data streams meeting the uplink transmission conditions in the multiple uplink transmission data streams are capable of uplink data transmission, and the rest of the uplink transmission data streams are incapable of uplink data transmission.

In this embodiment, the Node B uses the absolute grant delivered through the E-AGCH to bear the indication information indicating the uplink data transmission mode of the UE, which fully utilizes the resources of the E-AGCH and improves the utilization ratio of the resources. Moreover, the operation is simple and easy to be implemented. In addition, the UE is not only capable of knowing whether it is the single-stream mode or the multi-stream mode that the Node B determines for the UE for uplink data transmission, but also capable of knowing the specific uplink transmission data streams on which the uplink transmission is performed.

In another embodiment of the present invention, the Node B may establish an information bearing channel to bear the indication information indicating the uplink data transmission mode of the UE determined by the Node B. Optimally, the information bearing channel may be established with reference to the E-RGCH.

In the HSUPA technology introduced to the R6 version, a downlink E-RGCH is further added. The E-RGCH bears scheduling information of the Node B for controlling an uplink transmission rate of the UE. A frame format of the E-RGCH is shown in FIG. 4.

A relative grant on the E-RGCH uses 3, 12 or 15 continuous slots to send information. Each slot is a sequence with a data length of 40. Therefore, a single E-RGCH supports power indications of 40 uplink users at most. This channel is divided into two types: the E-RGCH under a serving cell and the E-RGCH under a non-serving cell. The E-RGCH under the serving cell is a dedicated channel, which carries command information instructing the power of the UE to increase, hold and decrease, such as UP, HOLD and DOWN. When the TTI is set to 2 ms, the channel delivers a scheduling command every 2 ms (3 continuous slots); when the TTI is set to 10 ms, the channel delivers a scheduling command every 8 ms (12 continuous slots). The E-RGCH under the non-serving cell is a public channel, which carries load indication information of the cell such as a current load situation and whether the cell is overloaded. A scheduling delay of the channel is always 10 ms (15 continuous slots).

Figure 4:
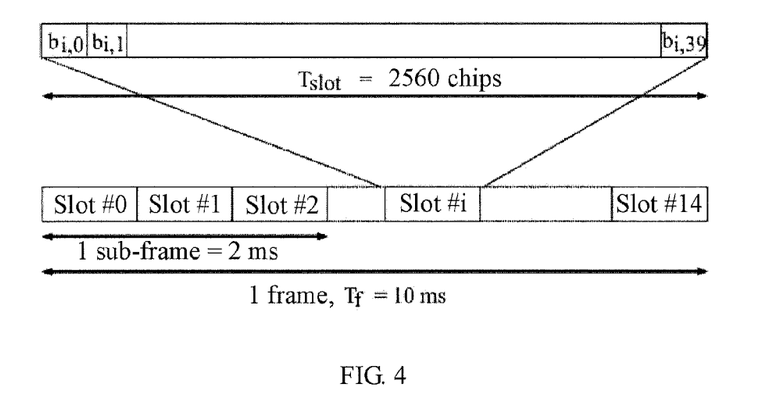
FIG. 4 is a schematic diagram of a frame structure of an E-DCH Relative Grant Channel (E-RGCH)

In FIG. 4, a sequence $b_{i,0}, b_{i,1}, \ldots, b_{i,39}$ transmitted by a slot i is defined by a formula $b_{i,j}=a\ C_{ss,40,m(i),j}$. In the serving E-DCH radio link set, the relative grant value a is +1, 0 or −1 (respectively representing increase, hold and decrease); in the non-serving E-DCH radio link set, the relative grant value a is 0 or −1. Table 4 shows mapping from a relative grant order to the relative grant value.

TABLE 4

| Order | Relative Grant Value (Serving E-DCH Radio Link Set) | Relative Grant Value (Other Radio Link Sets) |
|---|---|---|
| UP | +1 | Forbidden |
| HOLD | 0 | 0 |
| DOWN | −1 | −1 |

Orthogonal signature sequences $C_{ss,40,m(i)}$ are shown in Table 5. An index m(i) of the slot i is obtained from Table 6. The E-RGCH signature sequence index 1 in Table 6 is configured by an upper layer. A specific method for selecting the signature sequence is described as follows: finding a corresponding row in the "Sequence index 1" column of Table 6 according to a value of the signature sequence index 1 configured by the upper layer, obtaining values of the index m(i) of different slots according to the value of the slot i in the row, and then finding a corresponding row in Table 5 according to the value of m(i). The signature sequence expressed in the row is the signature sequence used by the slot i. Table 5 shows the signature sequences of the E-RGCH and the E-DCH HARQ Acknowledgement Indicator Channel (E-HICH). Table 6 shows a signature hopping pattern of the E-RGCH. In Table 5, bits are sent in an order from left to right. For example, the second column represents index j=0, and the rightmost column represents j=39.

TABLE 5

| | | | | | | | | | | | | | | | | | | | | |
|---|---|---|---|---|---|---|---|---|---|---|---|---|---|---|---|---|---|---|---|---|
| Css, 40, 0 | −1 | −1 | −1 | 1 | −1 | 1 | −1 | −1 | 1 | 1 | −1 | −1 | 1 | −1 | 1 | 1 | −1 | 1 | 1 | −1 |
| Css, 40, 1 | −1 | 1 | 1 | −1 | −1 | 1 | 1 | 1 | −1 | −1 | 1 | −1 | 1 | 1 | −1 | −1 | −1 | −1 | 1 | 1 |
| Css, 40, 2 | −1 | −1 | −1 | 1 | −1 | 1 | 1 | 1 | −1 | −1 | −1 | −1 | 1 | −1 | −1 | 1 | 1 | −1 | −1 | 1 |
| Css, 40, 3 | 1 | −1 | −1 | −1 | −1 | −1 | −1 | 1 | 1 | 1 | −1 | 1 | −1 | 1 | −1 | 1 | −1 | −1 | 1 | 1 |
| Css, 40, 4 | 1 | 1 | 1 | −1 | −1 | 1 | −1 | 1 | −1 | −1 | 1 | 1 | −1 | 1 | 1 | 1 | 1 | 1 | 1 | 1 |
| Css, 40, 5 | −1 | 1 | −1 | −1 | 1 | 1 | 1 | −1 | 1 | 1 | −1 | 1 | 1 | 1 | −1 | 1 | 1 | 1 | −1 | −1 |
| Css, 40, 6 | 1 | 1 | −1 | −1 | −1 | 1 | 1 | −1 | 1 | 1 | −1 | −1 | 1 | −1 | −1 | −1 | −1 | 1 | 1 | −1 |
| Css, 40, 7 | −1 | 1 | 1 | −1 | 1 | 1 | −1 | −1 | −1 | −1 | 1 | 1 | 1 | 1 | −1 | −1 | −1 | 1 | −1 | 1 |
| Css, 40, 8 | 1 | 1 | −1 | 1 | 1 | −1 | 1 | 1 | 1 | −1 | −1 | −1 | −1 | 1 | −1 | 1 | −1 | 1 | 1 | 1 |
| Css, 40, 9 | −1 | 1 | −1 | −1 | −1 | 1 | −1 | 1 | −1 | −1 | 1 | −1 | 1 | 1 | 1 | −1 | 1 | 1 | −1 | 1 |
| Css, 40, 10 | −1 | 1 | 1 | −1 | 1 | 1 | −1 | 1 | 1 | 1 | 1 | −1 | 1 | −1 | 1 | 1 | −1 | −1 | −1 | 1 |
| Css, 40, 11 | −1 | 1 | −1 | −1 | −1 | −1 | −1 | 1 | 1 | 1 | −1 | 1 | −1 | 1 | 1 | −1 | 1 | 1 | −1 | 1 |
| Css, 40, 12 | −1 | −1 | −1 | −1 | 1 | −1 | 1 | 1 | −1 | −1 | −1 | −1 | 1 | −1 | 1 | 1 | 1 | −1 | 1 | 1 |
| Css, 40, 13 | 1 | 1 | 1 | 1 | −1 | −1 | 1 | −1 | −1 | −1 | −1 | 1 | −1 | 1 | 1 | 1 | −1 | 1 | −1 | −1 |
| Css, 40, 14 | −1 | 1 | 1 | 1 | −1 | −1 | −1 | −1 | 1 | 1 | 1 | −1 | 1 | −1 | 1 | 1 | −1 | 1 | 1 | −1 |
| Css, 40, 15 | −1 | −1 | 1 | 1 | −1 | 1 | 1 | 1 | 1 | 1 | 1 | 1 | 1 | 1 | −1 | 1 | 1 | 1 | 1 | 1 |
| Css, 40, 16 | 1 | −1 | −1 | −1 | 1 | −1 | −1 | −1 | −1 | 1 | −1 | 1 | 1 | 1 | −1 | 1 | 1 | −1 | −1 | 1 |
| Css, 40, 17 | 1 | −1 | 1 | −1 | 1 | 1 | 1 | −1 | 1 | 1 | −1 | 1 | 1 | 1 | 1 | 1 | 1 | −1 | 1 | 1 |
| Css, 40, 18 | 1 | 1 | −1 | 1 | −1 | 1 | 1 | 1 | 1 | 1 | −1 | 1 | 1 | 1 | 1 | −1 | −1 | −1 | 1 | 1 |
| Css, 40, 19 | 1 | 1 | −1 | 1 | 1 | 1 | 1 | −1 | 1 | −1 | −1 | −1 | 1 | 1 | 1 | −1 | 1 | 1 | 1 | 1 |
| Css, 40, 20 | 1 | 1 | 1 | −1 | 1 | 1 | 1 | −1 | 1 | −1 | 1 | −1 | −1 | 1 | −1 | 1 | −1 | 1 | 1 | 1 |
| Css, 40, 21 | −1 | 1 | 1 | −1 | −1 | −1 | −1 | 1 | 1 | −1 | 1 | 1 | −1 | 1 | 1 | 1 | 1 | −1 | 1 | 1 |
| Css, 40, 22 | −1 | −1 | −1 | 1 | −1 | −1 | −1 | 1 | −1 | 1 | 1 | −1 | 1 | 1 | −1 | −1 | −1 | 1 | 1 | 1 |
| Css, 40, 23 | 1 | −1 | −1 | −1 | −1 | 1 | 1 | 1 | 1 | −1 | 1 | −1 | −1 | −1 | 1 | 1 | −1 | 1 | −1 | −1 |
| Css, 40, 24 | −1 | −1 | −1 | 1 | 1 | −1 | 1 | 1 | −1 | 1 | −1 | −1 | −1 | 1 | 1 | −1 | 1 | 1 | 1 | 1 |
| Css, 40, 25 | −1 | 1 | −1 | 1 | −1 | 1 | −1 | −1 | 1 | 1 | 1 | −1 | −1 | −1 | 1 | 1 | 1 | 1 | 1 | 1 |
| Css, 40, 26 | −1 | −1 | 1 | 1 | 1 | 1 | 1 | 1 | −1 | 1 | −1 | 1 | −1 | 1 | −1 | −1 | −1 | 1 | 1 | −1 |
| Css, 40, 27 | 1 | −1 | 1 | −1 | −1 | 1 | −1 | 1 | 1 | −1 | −1 | −1 | 1 | −1 | −1 | −1 | 1 | 1 | 1 | −1 |
| Css, 40, 28 | 1 | 1 | −1 | 1 | 1 | 1 | 1 | −1 | 1 | 1 | −1 | 1 | 1 | 1 | 1 | −1 | −1 | −1 | 1 | 1 |
| Css, 40, 29 | −1 | 1 | −1 | −1 | −1 | 1 | −1 | −1 | 1 | 1 | 1 | −1 | 1 | −1 | −1 | −1 | −1 | 1 | 1 | 1 |
| Css, 40, 30 | −1 | 1 | 1 | −1 | 1 | −1 | 1 | 1 | −1 | −1 | 1 | 1 | −1 | 1 | 1 | −1 | 1 | 1 | 1 | 1 |
| Css, 40, 31 | −1 | 1 | −1 | −1 | −1 | 1 | 1 | 1 | −1 | 1 | −1 | −1 | −1 | 1 | 1 | −1 | 1 | 1 | 1 | −1 |
| Css, 40, 32 | 1 | 1 | 1 | 1 | −1 | 1 | −1 | 1 | −1 | −1 | 1 | 1 | 1 | 1 | −1 | 1 | −1 | 1 | −1 | 1 |
| Css, 40, 33 | −1 | −1 | −1 | −1 | 1 | −1 | 1 | 1 | 1 | −1 | 1 | −1 | −1 | 1 | −1 | −1 | −1 | −1 | −1 | 1 |
| Css, 40, 34 | 1 | −1 | −1 | −1 | 1 | −1 | 1 | −1 | 1 | 1 | 1 | 1 | 1 | 1 | 1 | 1 | 1 | 1 | −1 | 1 |
| Css, 40, 35 | −1 | −1 | 1 | 1 | −1 | −1 | −1 | 1 | 1 | −1 | 1 | −1 | 1 | 1 | −1 | 1 | −1 | 1 | −1 | −1 |
| Css, 40, 36 | −1 | 1 | 1 | 1 | 1 | 1 | 1 | −1 | 1 | −1 | 1 | −1 | −1 | −1 | 1 | 1 | 1 | 1 | 1 | 1 |
| Css, 40, 37 | 1 | −1 | 1 | −1 | 1 | −1 | −1 | −1 | −1 | 1 | −1 | 1 | −1 | −1 | −1 | −1 | −1 | 1 | −1 | 1 |
| Css, 40, 38 | −1 | −1 | −1 | 1 | 1 | 1 | −1 | −1 | 1 | −1 | −1 | 1 | −1 | 1 | −1 | 1 | −1 | −1 | 1 | 1 |
| Css, 40, 39 | −1 | −1 | 1 | −1 | −1 | 1 | −1 | 1 | −1 | 1 | 1 | 1 | 1 | 1 | 1 | −1 | 1 | 1 | 1 | 1 |
| Css, 40, 0 | −1 | −1 | −1 | −1 | −1 | −1 | −1 | 1 | −1 | −1 | 1 | 1 | 1 | 1 | 1 | −1 | −1 | −1 |
| Css, 40, 1 | 1 | −1 | −1 | −1 | −1 | 1 | −1 | −1 | −1 | −1 | 1 | 1 | −1 | 1 | −1 | 1 | 1 | −1 |
| Css, 40, 2 | 1 | −1 | 1 | 1 | 1 | −1 | −1 | 1 | 1 | 1 | −1 | 1 | −1 | −1 | −1 | −1 | −1 | −1 |
| Css, 40, 3 | −1 | 1 | −1 | −1 | 1 | −1 | 1 | −1 | 1 | −1 | 1 | −1 | −1 | −1 | −1 | −1 | −1 | −1 |
| Css, 40, 4 | −1 | 1 | 1 | 1 | −1 | −1 | 1 | 1 | 1 | −1 | 1 | 1 | 1 | 1 | −1 | 1 | 1 | 1 |
| Css, 40, 5 | 1 | −1 | 1 | −1 | 1 | 1 | 1 | −1 | 1 | 1 | 1 | −1 | −1 | 1 | 1 | 1 | 1 | 1 |
| Css, 40, 6 | 1 | 1 | 1 | −1 | 1 | −1 | 1 | −1 | −1 | −1 | 1 | 1 | −1 | −1 | −1 | −1 | 1 | 1 |
| Css, 40, 7 | −1 | −1 | 1 | −1 | 1 | −1 | −1 | 1 | 1 | 1 | 1 | 1 | −1 | 1 | 1 | 1 | 1 | −1 |
| Css, 40, 8 | 1 | 1 | −1 | 1 | 1 | 1 | −1 | 1 | −1 | −1 | −1 | −1 | −1 | 1 | −1 | 1 | 1 | 1 |
| Css, 40, 9 | 1 | −1 | 1 | 1 | 1 | 1 | 1 | −1 | 1 | 1 | 1 | 1 | 1 | 1 | 1 | 1 | −1 | 1 |
| Css, 40, 10 | −1 | −1 | −1 | −1 | 1 | 1 | −1 | 1 | −1 | 1 | −1 | 1 | −1 | 1 | 1 | 1 | 1 | 1 |
| Css, 40, 11 | −1 | −1 | 1 | 1 | 1 | 1 | −1 | −1 | 1 | 1 | −1 | 1 | −1 | 1 | 1 | 1 | −1 | −1 |
| Css, 40, 12 | 1 | −1 | 1 | −1 | −1 | 1 | 1 | 1 | 1 | −1 | 1 | −1 | 1 | 1 | −1 | 1 | 1 | 1 |
| Css, 40, 13 | 1 | 1 | −1 | −1 | 1 | 1 | −1 | 1 | −1 | 1 | −1 | 1 | −1 | −1 | 1 | −1 | −1 | −1 |

TABLE 5-continued

| | | | | | | | | | | | | | | | | | | | | |
|---|---|---|---|---|---|---|---|---|---|---|---|---|---|---|---|---|---|---|---|---|
| Css, 40, 14 | -1 | -1 | 1 | 1 | -1 | 1 | 1 | 1 | 1 | 1 | -1 | -1 | -1 | -1 | 1 | -1 | -1 | 1 | -1 | 1 |
| Css, 40, 15 | 1 | -1 | -1 | 1 | 1 | 1 | 1 | -1 | -1 | 1 | 1 | 1 | 1 | -1 | 1 | 1 | -1 | -1 | -1 | 1 |
| Css, 40, 16 | -1 | 1 | -1 | 1 | -1 | 1 | 1 | -1 | -1 | -1 | -1 | -1 | -1 | -1 | -1 | 1 | -1 | -1 | -1 | 1 |
| Css, 40, 17 | 1 | 1 | 1 | 1 | 1 | 1 | -1 | 1 | 1 | -1 | 1 | -1 | 1 | 1 | 1 | 1 | -1 | 1 | -1 | -1 |
| Css, 40, 18 | 1 | 1 | 1 | -1 | -1 | 1 | 1 | 1 | 1 | 1 | 1 | -1 | -1 | 1 | -1 | 1 | 1 | 1 | -1 | 1 |
| Css, 40, 19 | -1 | 1 | -1 | 1 | 1 | 1 | 1 | 1 | -1 | 1 | -1 | 1 | 1 | 1 | -1 | 1 | 1 | 1 | 1 | 1 |
| Css, 40, 20 | 1 | -1 | -1 | 1 | 1 | 1 | 1 | -1 | 1 | 1 | -1 | -1 | 1 | 1 | -1 | 1 | -1 | -1 | -1 | -1 |
| Css, 40, 21 | 1 | 1 | 1 | -1 | -1 | 1 | -1 | -1 | -1 | -1 | 1 | 1 | 1 | -1 | 1 | 1 | 1 | -1 | 1 | 1 |
| Css, 40, 22 | 1 | 1 | -1 | 1 | 1 | -1 | -1 | 1 | 1 | 1 | -1 | 1 | -1 | 1 | 1 | -1 | 1 | -1 | 1 | 1 |
| Css, 40, 23 | -1 | -1 | 1 | -1 | 1 | 1 | -1 | 1 | -1 | 1 | 1 | -1 | 1 | 1 | 1 | 1 | -1 | 1 | 1 | 1 |
| Css, 40, 24 | 1 | 1 | 1 | -1 | 1 | 1 | 1 | -1 | -1 | -1 | 1 | -1 | 1 | -1 | -1 | 1 | 1 | 1 | -1 | -1 |
| Css, 40, 25 | 1 | 1 | 1 | 1 | -1 | 1 | -1 | 1 | -1 | 1 | -1 | 1 | -1 | 1 | -1 | 1 | -1 | -1 | -1 | 1 |
| Css, 40, 26 | -1 | 1 | 1 | 1 | 1 | -1 | 1 | -1 | -1 | -1 | -1 | 1 | 1 | -1 | 1 | -1 | -1 | 1 | -1 | 1 |
| Css, 40, 27 | 1 | -1 | 1 | 1 | -1 | -1 | 1 | 1 | -1 | 1 | 1 | 1 | -1 | -1 | -1 | 1 | 1 | 1 | 1 | -1 |
| Css, 40, 28 | 1 | -1 | 1 | 1 | -1 | -1 | -1 | -1 | -1 | -1 | 1 | 1 | 1 | 1 | 1 | -1 | -1 | -1 | -1 | 1 |
| Css, 40, 29 | 1 | 1 | 1 | 1 | 1 | -1 | 1 | 1 | -1 | 1 | -1 | 1 | -1 | 1 | 1 | -1 | 1 | -1 | 1 | -1 |
| Css, 40, 30 | -1 | 1 | 1 | -1 | 1 | 1 | -1 | 1 | 1 | 1 | -1 | 1 | -1 | 1 | -1 | -1 | -1 | -1 | -1 | -1 |
| Css, 40, 31 | -1 | 1 | -1 | 1 | 1 | 1 | -1 | -1 | 1 | 1 | 1 | -1 | -1 | -1 | 1 | -1 | 1 | -1 | 1 | 1 |
| Css, 40, 32 | -1 | -1 | 1 | 1 | 1 | -1 | -1 | -1 | -1 | -1 | -1 | 1 | 1 | -1 | -1 | 1 | 1 | -1 | 1 | 1 |
| Css, 40, 33 | -1 | 1 | -1 | 1 | -1 | -1 | 1 | -1 | 1 | 1 | -1 | 1 | 1 | -1 | 1 | 1 | 1 | 1 | -1 | -1 |
| Css, 40, 34 | 1 | -1 | 1 | -1 | 1 | -1 | -1 | -1 | -1 | 1 | -1 | -1 | 1 | -1 | -1 | 1 | 1 | 1 | -1 | 1 |
| Css, 40, 35 | 1 | 1 | 1 | 1 | 1 | 1 | 1 | -1 | -1 | -1 | -1 | -1 | 1 | 1 | -1 | 1 | 1 | 1 | 1 | -1 |
| Css, 40, 36 | 1 | 1 | -1 | -1 | 1 | -1 | -1 | 1 | 1 | -1 | -1 | -1 | -1 | 1 | 1 | 1 | -1 | -1 | 1 | 1 |
| Css, 40, 37 | 1 | -1 | -1 | 1 | 1 | 1 | -1 | 1 | 1 | 1 | 1 | -1 | 1 | -1 | 1 | -1 | 1 | -1 | 1 | 1 |
| Css, 40, 38 | -1 | 1 | 1 | 1 | 1 | -1 | -1 | -1 | -1 | 1 | 1 | -1 | 1 | 1 | 1 | -1 | 1 | -1 | 1 | 1 |
| Css, 40, 39 | 1 | 1 | -1 | -1 | -1 | -1 | -1 | -1 | 1 | 1 | -1 | 1 | 1 | 1 | -1 | -1 | -1 | 1 | 1 | 1 |

TABLE 6

| | Line Index m(i) for Slot i | | |
|---|---|---|---|
| Sequence Index 1 | i mod3 = 0 | i mod3 = 1 | i mod3 = 2 |
| 0 | 0 | 2 | 13 |
| 1 | 1 | 18 | 18 |
| 2 | 2 | 8 | 33 |
| 3 | 3 | 16 | 32 |
| 4 | 4 | 13 | 10 |
| 5 | 5 | 3 | 25 |
| 6 | 6 | 12 | 16 |
| 7 | 7 | 6 | 1 |
| 8 | 8 | 19 | 39 |
| 9 | 9 | 34 | 14 |
| 10 | 10 | 4 | 5 |
| 11 | 11 | 17 | 34 |
| 12 | 12 | 29 | 30 |
| 13 | 13 | 11 | 23 |
| 14 | 14 | 24 | 22 |
| 15 | 15 | 28 | 21 |
| 16 | 16 | 35 | 19 |
| 17 | 17 | 21 | 36 |
| 18 | 18 | 37 | 2 |
| 19 | 19 | 23 | 11 |
| 20 | 20 | 39 | 9 |
| 21 | 21 | 22 | 3 |
| 22 | 22 | 9 | 15 |
| 23 | 23 | 36 | 20 |
| 24 | 24 | 0 | 26 |
| 25 | 25 | 5 | 24 |
| 26 | 26 | 7 | 8 |
| 27 | 27 | 27 | 17 |
| 28 | 28 | 32 | 29 |
| 29 | 29 | 15 | 38 |
| 30 | 30 | 30 | 12 |
| 31 | 31 | 26 | 7 |
| 32 | 32 | 20 | 37 |
| 33 | 33 | 1 | 35 |
| 34 | 34 | 14 | 0 |
| 35 | 35 | 33 | 31 |
| 36 | 36 | 25 | 28 |
| 37 | 37 | 10 | 27 |
| 38 | 38 | 31 | 4 |
| 39 | 39 | 38 | 6 |

In this embodiment, for example, a=0 may be set to indicate that the UE uses the single-stream mode during uplink data transmission, and a=1 may be set to indicate that the UE uses the multi-stream mode during uplink data transmission.

Alternatively, a=1 may be set to indicate that the UE uses the single-stream mode during uplink data transmission, and a=0 is set to indicate that the UE uses the multi-stream mode during uplink data transmission.

Through the above multiple modes, the Node B may conveniently notify the UE of the indication information indicating the determined uplink data transmission mode of the UE.

In all the communication method embodiments using the MIMO technology according to the embodiments of the present invention, after the notification step S120, the communication method may further include the following steps.

Receiving step S130: The UE receives the indication information from the network side device.

Decision step S140: The UE decides a transmission mode for the uplink data transmission according to the indication information.

Transmission step S150: The UE performs the uplink data transmission according to the transmission mode decided in the decision step.

The decision step S140 may include two solutions.

In one solution, the UE, exactly according to the indication of the network side device, decides to use the uplink data transmission mode determined by the network side device during uplink data transmission. That is to say, when the network side device determines that the uplink data transmission mode of the UE is the single-stream mode in the determination step, the UE decides to use the single-stream mode during uplink data transmission; when the network side device determines that the uplink data transmission mode of the UE is the multi-stream mode in the determination step, the UE decides to use the multi-stream mode during uplink data transmission.

In another solution, the UE decides whether the uplink data transmission mode is the single-stream mode or the multi-stream mode with reference to the indication of the network side device. That is to say, when the network side device determines that the uplink data transmission mode of the UE is the single-stream mode in the determination step, the UE decides to use the single-stream mode during uplink data transmission. When the network side device determines that the uplink data transmission mode of the UE is the multi-stream mode in the determination step, the UE decides whether the uplink data transmission mode is the single-stream mode or the multi-stream mode based on the indication information of the network side device in combination with various conditions of the UE, for example, factors such as the power and the uplink data amount of the UE.

For example, when the power of the UE is small (for instance, when the power of the UE is lower than 40% of the maximum power, it may be regarded that the power of the UE is small), and/or when the uplink data amount of the UE is small (for instance, when the size of the uplink transport block is smaller than 1458 bits, it may be regarded that the uplink data amount is small), the UE may decide that the uplink data transmission mode is the single-stream mode. Similarly, when the power of the UE is great (for instance, when the power of the UE is not lower than 40% of the maximum power, it may be regarded that the power of the UE is great), and/or when the uplink data amount of the UE is big (for instance, when the size of the uplink transport block is not smaller than 1458 bits, it may be regarded that the uplink data amount is big), the UE may decide that the uplink data transmission mode is the multi-stream mode.

Figure 5:
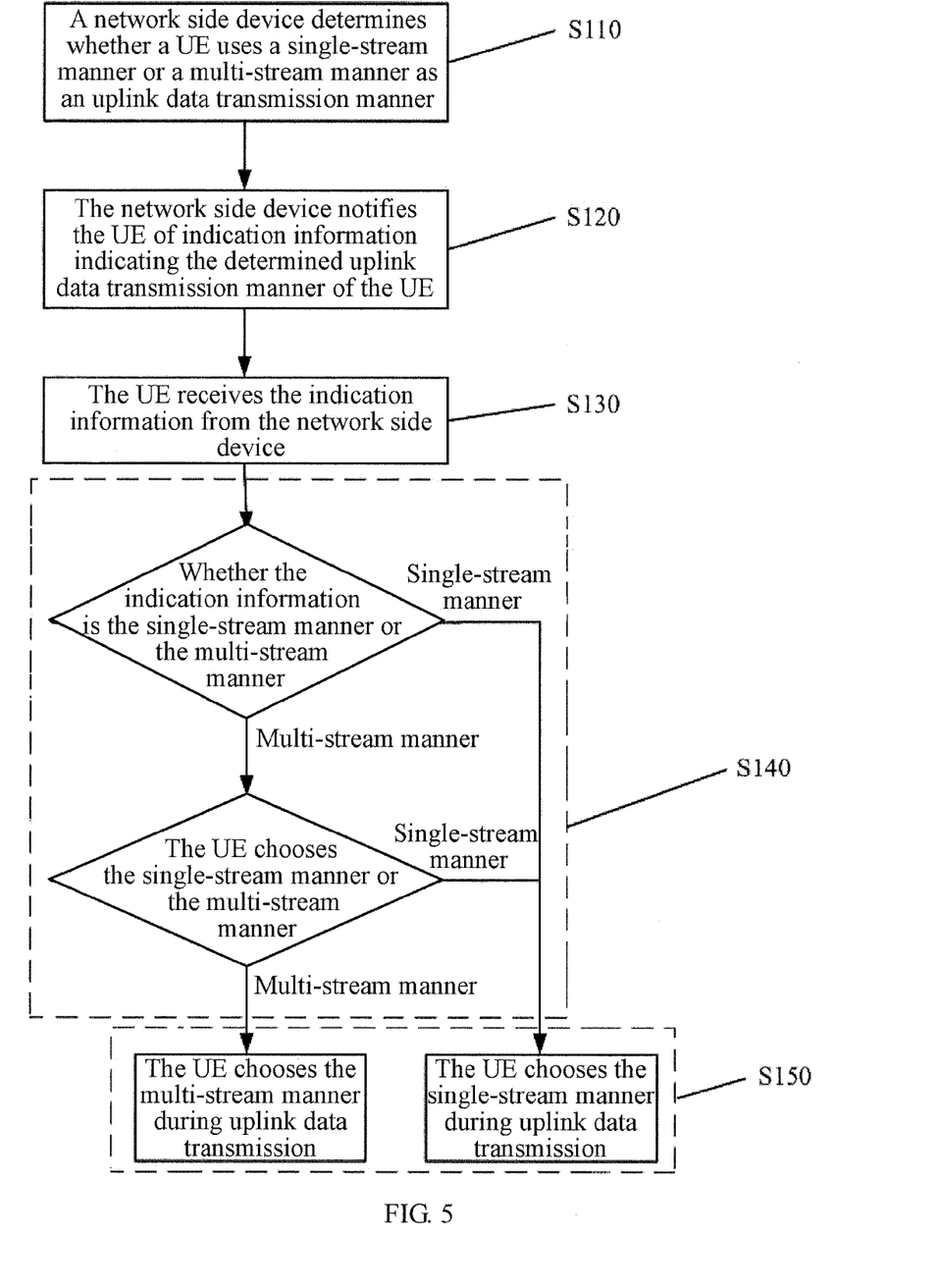
FIG. 5 is a flow chart of a communication method according to another embodiment of the present invention.

As shown in FIG. 5, when the network side device determines that the uplink data transmission mode of the UE is the single-stream mode, it means that the uplink transmission data amount of the UE is small and does not require the multi-stream mode, or the network side device does not meet conditions of the uplink data transmission through the multi-stream mode. Therefore, the UE may decide to use the single-stream mode during uplink data transmission. In another aspect, when the network side device determines that the uplink data transmission mode of the UE is the multi-stream mode, it indicates that the network side device is capable of accepting that the UE uses the multi-stream mode during uplink data transmission. However, the UE may also choose whether to use the single-stream mode or the multi-stream mode during uplink data transmission according to factors such as whether the uplink transmission data amount of the UE or whether the power of the UE is limited. For example, in a power shortage situation, the UE may decide to use the single-stream mode during uplink data transmission; or when the uplink transmission data amount is not great, the UE may also decide to use the single-stream mode rather than the multi-stream mode during uplink data transmission.

In this way, the UE may give consideration to a situation of the network side device, a situation of the UE, and a specific actual situation, and meanwhile further optimize the uplink data transmission mode, so as to reduce the delay of the data transmission and improve a data uplink transmission speed, thereby making the UE more intelligent.

The following describes a communication system according to an embodiment of the present invention.

Figure 6:
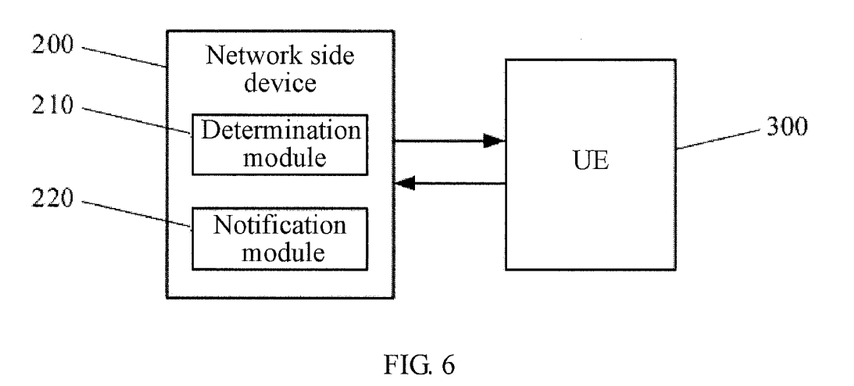
FIG. 6 is a flow chart of a communication system according to an embodiment of the present invention.
Figure 7:
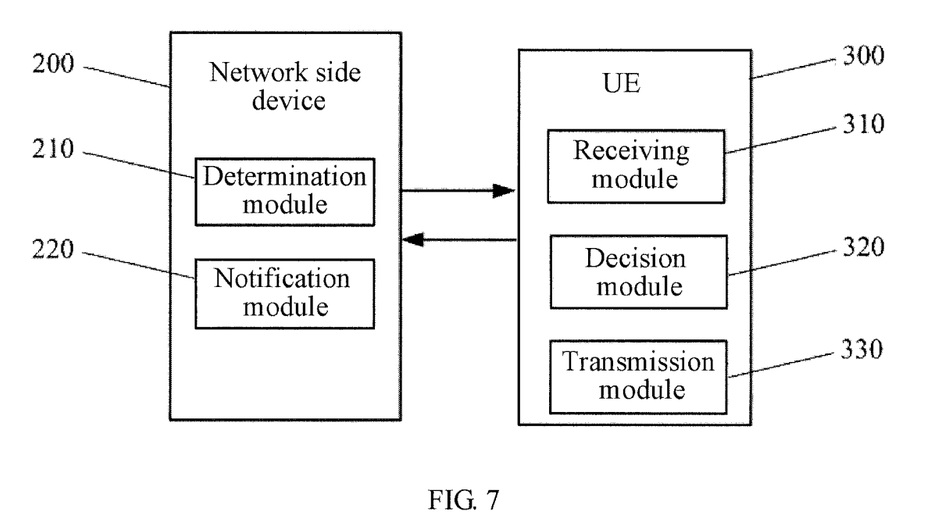
FIG. 7 is a flow chart of a communication system according to another embodiment of the present invention.

As shown in FIG. 6, the communication system using uplink MIMO technology according to the embodiment of the present invention includes a network side device 200 and a UE 300. The network side device 200 includes: a determination module 210, configured to determine whether an uplink data transmission mode of the UE 300 is a single-stream mode or a multi-stream mode, and a notification module 220, configured to notify the UE 300 of indication information indicating the determined uplink data transmission mode.

In the system, the determination module 210 may determine the uplink data transmission mode of the UE according to any one of, several of or all of the following factors: an uplink transmission data amount of the UE, the quality of a channel related to uplink data transmission, a scheduling capability of a Node B, a load situation of a serving cell where the UE is located, and power of the UE. The notification module 220 may also use an information notification mode the same as or similar to the description in the communication method according to the embodiment of the present invention (namely the information notification mode used in step S120), for example, delivering an HS-SCCH order, delivering an E-AGCH grant through an E-AGCH or establishing a new channel to bear a uplink data mode, so as to notify the UE 300 of the indication information.

The UE 300 may further include a receiving module 310, a decision module 320 and a transmission module 330.

The receiving module 310 receives the indication information from the network side device 200.

The decision module 320 decides a transmission mode during uplink data transmission according to the indication information.

The transmission module 330 performs the uplink data transmission using the transmission mode decided by the decision module 320.

In this embodiment, when the indication information indicates the single-stream mode, the decision module 320 decides to use the single-stream mode during uplink data transmission; when the indication information indicates the multi-stream mode, the decision module 320 may choose whether to use the single-stream mode or the multi-stream mode during uplink data transmission.

In the communication system using the MIMO technology according to the embodiment of the present invention, the network side device determines the uplink data transmission mode of the UE when the UE performs the uplink data transmission and notifies the UE of the uplink data transmission mode, so that the network side device can provide more advanced services, therefore meeting requirements of uplink high-speed data communication services of the UE and improving a resource utilization ratio of the network side device. In another aspect, the UE fully utilizes resources provided by the network side device, and meanwhile gives consideration to a situation of the UE and a specific actual situation, thereby further optimizing the uplink data transmission mode, reducing a delay of data transmission, improving a data uplink transmission speed, and making the UE more intelligent.

In the embodiments of the present invention, the multi-stream mode may be a double-stream mode. For example, in a situation of two uplink antennas, the multi-stream mode only refers to the double-stream mode. In a situation with more uplink antennas, the multi-stream mode may refer to the double-stream mode, or refer to other multi-stream modes besides the double-stream mode.

Persons of ordinary skill in the art may understand that all or a part of the steps of the communication method according to the embodiments of the present invention may be implemented by a program instructing relevant hardware. The program may be stored in a readable storage medium. When the program is run, the corresponding steps of the communication method are performed. The storage medium may be a Read-Only Memory (ROM), a Random Access Memory (RAM), a magnetic disk or an optical disk.

Although the present invention has been described in detail with reference to the accompanying drawings and exemplary embodiments, the present invention is not limited to this. Equivalent replacements or modifications may be made to the embodiments of the present invention by persons of ordinary skill in the art without departing from the spirit and essence of the present invention, and these replacements and modifications fall within the scope of the present invention.

What is claimed is:

1. A communication method using uplink Multiple Input Multiple Output (MIMO) technology, comprising:
determining, by a network side device, an uplink data transmission mode of a single-stream in a time period uplink data transmission mode or a multi-stream in a time period uplink data transmission mode for a User Equipment (UE) to use for transmission of data to the network side device; and
notifying, by the network side device, the UE through a downlink channel of indication information indicating the determined uplink data transmission mode of the UE,
wherein when the network side device is a Node B and the Node B determines that the uplink data transmission mode of the UE is the single-stream in the time period uplink data transmission mode, the notifying comprises:
setting, by the Node B, an absolute grant delivered on an Enhanced Dedicated Channel Absolute Grant Channel (E-AGCH) corresponding to a data stream in multiple data streams to deliver an absolute grant with an absolute grant value corresponding to an index value except for 0 or 1 index values, and
setting, by the Node B, E-AGCHs corresponding to other data streams in the multiple data streams to respectively deliver an absolute grant with an absolute grant value corresponding to index value 0 or 1 and with an absolute grant scope corresponding to index value 0; or
wherein when the network side device is a Node B and the Node B determines that the uplink data transmission mode of the UE is the multi-stream in the time period uplink data transmission mode, the notifying comprises:
setting, by the Node B, E-AGCHs corresponding to at least two data streams in the multiple data streams to respectively deliver an absolute grant with an absolute grant value corresponding to an index value except for 0 or 1 index values.

2. The communication method according to claim 1, wherein the determining comprises:
determining, by the network side device, the uplink data transmission mode of the UE according to at least one of the following factors: an uplink transmission data amount of the UE, quality of a channel related to uplink data transmission, scheduling capability of a Node B as the network side device, load situation of a serving cell where the UE is located, and power of the UE.

3. The communication method according to claim 1, wherein when the network side device is a Node B,
the notifying comprises:
notifying, by the Node B, the UE of the indication information by delivering a Shared Control Channel for High Speed Downlink Shared Channel (HS-SCCH) order; wherein Hybrid Automatic Repeat Request (HARQ) process information, and redundancy and constellation version information of the HS-SCCH order are set as order type and order of the HS-SCCH order; wherein the order type and the order bear the indication information.

4. The communication method according to claim 3, wherein the order type is $X_{odt,1}$, $X_{odt,2}$, $X_{odt,3}$, and the order is $X_{ord,1}$, $X_{ord,2}$, $X_{ord,3}$; the order type $X_{odt,1}$, $X_{odt,2}$, $X_{odt,3}$ is set to "001", and the order $X_{ord,1}$, and/or $X_{ord,2}$ is set to bear the indication information.

5. The communication method according to claim 3, wherein the order type is $X_{odt,1}$, $X_{odt,2}$, $X_{odt,3}$, and the order is $X_{ord,1}$, $X_{ord,2}$, $X_{ord,3}$; the order type $X_{odt,1}$, $X_{odt,2}$, $X_{odt,3}$ is set to any binary combination except "000" and "001", and the order $X_{ord,1}$ or $X_{ord,2}$ or $X_{ord,3}$ or any combination of $X_{odt,1}$, $X_{odt,2}$ and $X_{odt,3}$ is set to bear the indication information.

6. A communication method using uplink Multiple Input Multiple Output (MIMO) technology, comprising:
receiving, by a User Equipment (UE), an indication information indicating a determined uplink data transmission mode of the UE from a network side device; wherein the determined uplink data transmission mode of the UE is a single-stream in a time period uplink data transmission mode or a multi-stream in a time period uplink data transmission mode as determined by the network side device;
deciding, by the UE, an uplink data transmission mode during uplink data transmission according to the indication information received from the network side device; and
performing, by the UE, the uplink data transmission to the network side device according to the decided uplink data transmission mode,
wherein when the receiving, by the UE, comprises receiving the indication information through an absolute grant borne on an Enhanced Dedicated Channel Absolute Grant Channel (E-AGCH),
when the indication information through the E-AGCH indicates that the uplink data transmission mode determined by a Node B as the network side device is the single-stream in the time period uplink data transmission mode,
an E-AGCH corresponding to a data stream in multiple data streams is set to deliver an absolute grant with an absolute grant value corresponding to an index value except for 0 or 1 index values, and
E-AGCHs corresponding to other data streams in the multiple data streams are set to respectively deliver an absolute grant with an absolute grant value corresponding to index value 0 or 1 and with an absolute grant scope corresponding to index value 0; or
when the indication information through the E-AGCH indicates that the uplink data transmission mode determined by a Node B as the network side device is the multi-stream in the time period uplink data transmission mode, E-AGCHs corresponding to at least two data streams in the multiple data streams are set to respectively deliver an absolute grant with an absolute grant value corresponding to an index value except for 0 or 1 index values.

7. The communication method according to claim 6, wherein the receiving comprises:
receiving, by the UE, the indication information through a Shared Control Channel for High Speed Downlink Shared Channel (HS-SCCH) order,
wherein Hybrid Automatic Repeat Request (HARQ) process information, and redundancy and constellation version information are set as order type and order of the HS-SCCH order;
wherein the order type and the order bear the indication information.

8. The communication method according to claim 7, wherein the order type is $X_{odt,1}$, $X_{odt,2}$, $X_{odt,3}$, and the order is $X_{ord,1}$, $X_{ord,2}$, $X_{ord,3}$; the order type $X_{odt,1}$, $X_{odt,2}$, $X_{odt,3}$ is set to "001", and the order $X_{ord,1}$ and/or $X_{ord,2}$ is set to bear the indication information.

9. The communication method according to claim 7, wherein the order type is $X_{odt,1}$, $X_{odt,2}$, $X_{odt,3}$, and the order is $X_{ord,1}$, $X_{ord,2}$, $X_{ord,3}$; the order type $X_{odt,1}$, $X_{odt,2}$, $X_{odt,3}$ is set to any binary combination except "000" and "001", and the order $X_{ord,1}$ or $X_{ord,2}$ or $X_{ord,3}$ or any combination of $X_{odt,1}$, $X_{odt,2}$ and $X_{odt,3}$ is set to bear the indication information.

10. A communication system using uplink Multiple Input Multiple Output (MIMO) technology, comprising:
   a network side device communicating with a User Equipment (UE), wherein the network side device comprises:
      a determination module, configured to determine an uplink data transmission mode of a single-stream in a time period uplink data transmission mode or a multi-stream in a time period uplink data transmission mode for the UE to use for transmission of data to the network side device; and
      a notification module, configured to notify through a downlink channel the UE of indication information indicating the determined uplink data transmission mode of the UE,
   wherein when the network side device is a Node B and the determination module determines that the uplink data transmission mode of the UE is the single-stream in the time period uplink data transmission mode, the notification module is further configured to:
      set an Enhanced Dedicated Channel Absolute Grant Channel (E-AGCH) corresponding to a data stream in multiple data streams to deliver an absolute grant with an absolute grant value corresponding to an index value except for 0 or 1 index values, and
      set E-AGCHs corresponding to other data streams in the multiple data streams to respectively deliver an absolute grant with an absolute grant value corresponding to the index value 0 or 1 and with an absolute grant scope corresponding to index value 0; or
   wherein when the network side device is a Node B and the determination module determines that the uplink data transmission mode of the UE is the multi-stream in the time period uplink data transmission mode, the notification module is further configured to set E-AGCHs corresponding to at least two data streams in the multiple data streams to respectively deliver an absolute grant with an absolute grant value corresponding to an index value except for 0 or 1 index values.

11. The communication system according to claim 10, wherein when the network side device is a Node B, the notification module is further configured to notify the UE of the indication information by delivering a Shared Control Channel for High Speed Downlink Shared Channel (HS-SCCH) order; wherein
   Hybrid Automatic Repeat Request (HARQ) process information, and redundancy and constellation version information are set as order type and order of the HS-SCCH order; wherein the order type and the order is set to bear the indication information.

12. The communication system according to claim 11, wherein the order type is $X_{odt,1}$, $X_{odt,2}$, $X_{odt,3}$, and the order is $X_{ord,1}$, $X_{ord,2}$, $X_{ord,3}$; the order type $X_{odt,1}$, $X_{odt,2}$, $X_{odt,3}$ is set to "001" and the order $X_{ord,1}$ and/or $X_{ord,2}$ is set to bear the indication information.

13. The communication system according to claim 11, wherein the order type is $X_{odt,1}$, $X_{odt,2}$, $X_{odt,3}$, and the order is $X_{ord,1}$, $X_{ord,2}$, $X_{ord,3}$; the order type $X_{odt,1}$, $X_{odt,2}$, $X_{odt,3}$ is set to any binary combination except "000" and "001", and the order $X_{ord,1}$ or $X_{ord,2}$ or $X_{ord,3}$ or any combination of the order $X_{odt,1}$, $X_{odt,2}$ and $X_{odt,3}$ is set to bear the indication information.

* * * * *